COMPUTER FOR NETWORK SYNTHESIS

Filed March 21, 1955 4 Sheets-Sheet 1

INVENTOR
J. T. BANGERT
BY W. L. Keefauver
ATTORNEY

Oct. 27, 1959 J. T. BANGERT 2,910,241

COMPUTER FOR NETWORK SYNTHESIS

Filed March 21, 1955 4 Sheets-Sheet 2

INVENTOR
J. T. BANGERT
BY W. L. Keefauver
ATTORNEY

Oct. 27, 1959 J. T. BANGERT 2,910,241

COMPUTER FOR NETWORK SYNTHESIS

Filed March 21, 1955 4 Sheets-Sheet 3

INVENTOR
J. T. BANGERT
BY W. L. Keefauver
ATTORNEY

COMPUTER FOR NETWORK SYNTHESIS

Filed March 21, 1955 4 Sheets-Sheet 4

INVENTOR
J. T. BANGERT
BY W. L. Keefauver
ATTORNEY 2,910,241

COMPUTER FOR NETWORK SYNTHESIS

John T. Bangert, Summit, N.J., assignor to Bell Telephone Laboratories, Incorporated, New York, N.Y., a corporation of New York Application March 21, 1955, Serial No. 495,722

10 Claims. (Cl. 235—180)

This invention relates to network synthesis. The synthesis of networks may be divided into two stages, an approximation stage and a realization stage. In the first stage, the designer approximates the system function which will give a desired characteristic. Since it is known that the complex transmission of a network can be represented within a constant by an array of singularities consisting of natural modes and infinite loss points, one way of describing a network is in terms of its poles (natural modes) and zeros (infinite loss points). In the second stage, known techniques are employed to realize a physical network having given poles and zeros. The present invention is concerned only with the approximation stage and the realization stage will not be discussed.

One way of checking an approximation prior to undertaking the network realization is the relatively laborious method of computing amplitude and delay at various frequencies of interest to see if the assumed poles and zeros yield the desired results. This involves inserting some frequency of interest in the formula and after a sequence of arithmetic operations finding a number which represents the phase or amplitude of the network at the given frequency. Another frequency is then selected and the process repeated until an accurate curve can be drawn. With complex networks, such as multi-section equalizer networks, this may involve many computations together with many shifts in the pole and zero locations on the complex frequency plane before the desired characteristic is obtained. Even with ordinary machine calculators this method is slow. Further, there is the handicap that considerable judgment must be exercised in specifying a list of frequencies which will sufficiently define the characteristic without wasting effort on unnecessary points.

A major object of the present invention is to simplify the approximation stage of network synthesis.

Another object of the invention is to mechanize the approximation stage so that relatively unskilled operators may quickly and accurately determine the amplitude and delay characteristics that a specified system function will yield.

Still another object is to rapidly compute and display amplitude and delay characteristics of a network, given its singularities.

A feature of the specific embodiments, described below for purposes of illustration, is that, although the computation performed yields results in the frequency domain, the actual computation is performed in the time domain so that a highly flexible computer with relatively simple circuitry is possible. Another feature of these embodiments, is that the computer is so programmed that, given a rough idea of the location of poles and zeros for a specified characteristic, a relatively unskilled operator may easily determine their exact location by simple trial and error potentiometer adjustments. In one embodiment these potentiometers are calibrated directly in terms of the pole and zero locations so that once the characteristic displayed is exactly the one desired, their setting accurately specifies the system function of a network which will yield the same characteristic. Another feature is that once the potentiometers are adjusted, the characteristic may be displayed almost instantaneously on an oscilloscope.

The invention, together with its various objects and features, may be more fully appreciated from a consideration of the following detailed description when read in accordance with the attached drawings in which.

The present invention stems in part from applicant's realization that although the system function of a network is generally considered a specification of either amplitude or delay over a frequency band of interest, computation may be simplified by computing in the time domain.

In arriving at the present invention, the complex transmission is divided into two parts, an amplitude function and a delay function. The amplitude transmission of a network at any frequency can be expressed as a fraction in which both numerator and denominator consist of a product of factors. Each factor in the numerator represents the vector length in the p-plane from the frequency of interest to an infinite loss point while each factor in the denominator represents the distance from the frequency of interest to a natural mode. Since complex singularities always occur in pairs, it is advantageous to consider such a pair as a unit to be represented by a single factor.

Figure 1:
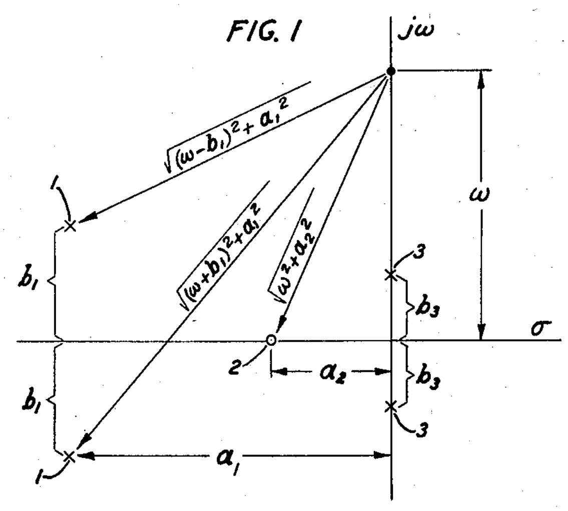
Fig. 1 is a graph which aids in understanding the mathematical basis of the invention.

A pair of infinite loss points 1 are shown on the complex frequency plane, $(p+a_n+jb_n)$, in the diagram of Fig. 1 wherein their distance from the $j\omega$ axis is $a_1$ and their distance from the $\sigma$ axis is $b_1$. (For a discussion of the complex frequency plane, see H. W. Bode, "Network Analysis and Feedback Amplifier Design," Van Nostrand 1945, chapter 2.)

It is well known in the art that the effect on the amplitude response of a network due to such a singularity can be measured by the distance from a test frequency $\omega$ to the singularity in question. (See, for example, S. Darlington, "The Potential Analog Method of Network Synthesis," 30 Bell System Technical Journal 315; April 1951.) With reference to the geometry of Fig. 1, the amplitude factor A, is:

$$A=\sqrt{(\omega-b_n)^2+a_n^2}\cdot\sqrt{(\omega+b_n)^2+a_n^2}. \quad (1$$

By straightforward mathematical manipulation, Equation 1 may be expressed as follows:

$$A^2=[(\omega-b_n)(\omega+b_n)]^2 +a_n^2[\omega^2-2b_n\omega+b_n^2+\omega^2+2b_n\omega+b_n^2]+a_n^4 \quad (2)$$

$$A^2=(\omega^2-b_n^2)^2+2a_n^2\omega^2+2a_n^2b_n^2+a_n^4 \quad (3)$$

$$A^2=\omega^4-2b_n^2\omega^2+b_n^4+2a_n^2\omega^2+2a_n^2b_n^2+a_n^4 \quad (4)$$

$$A^2=\omega^4+2\omega^2(a_n^2-b_n^2)+a_n^4+2a_n^2b_n^2+b_n^4 \quad (5)$$

Now let:

$$\alpha_n=a_n^2-b_n^2$$
$$\beta_n=a_n^2+b_n^2 \quad (6)$$

therefore $$A=\sqrt{\omega^4+2\alpha_n\omega^2+\beta_n^2} \qquad (7)$$

Equation 7 therefore is the amplitude factor for a pair of complex singularities. This equation obviously applies whether the singularity be a natural mode or an infinite loss point.

By similar reasoning, the amplitude factor for a singularity on the $\sigma$ or real-axis such as the zero 2 in Fig. 1 is $$A=\sqrt{\omega^2+a_n^2} \qquad (8)$$

while the amplitude factor for an imaginary-axis singularity, such as the pair of poles 3 in Fig. 1, is $$A=\sqrt{(\omega^2-b_n^2)^2} \qquad (9)$$

The effect on the phase of a network due to a singularity in the complex plane can be measured by the angle between the line joining the singularity and the test frequency, and the $\sigma$ axis. This phase $\varphi$ is $$\varphi=\varphi_1+\varphi_2 \qquad (10)$$

or $$\varphi=\arctan\frac{\omega-b_n}{a_n}+\arctan\frac{\omega+b_n}{a_n} \qquad (11)$$

Since the delay is the derivative of the phase with respect to the angular frequency, the delay component for a pair of complex singularities, such as the poles 1, is $$\text{Delay}=\frac{d\varphi}{d\omega}=\frac{1}{a_n}\left[\frac{1}{1+\left(\frac{\omega-b_n}{a_n}\right)^2}+\frac{1}{1+\left(\frac{\omega+b_n}{a_n}\right)^2}\right] \qquad (12)$$

$$=\frac{a_n}{a_n^2+\omega^2-2b_n\omega+b_n^2}+\frac{a_n}{a_n^2+\omega^2+2b_n\omega+b_n^2} \qquad (13)$$

$$=\frac{a_n[a_n^2+\omega^2-2b_n\omega+b_n^2+a_n^2+\omega^2+2b_n\omega+b_n^2]}{\omega^4+2\omega^2(a_n^2-b_n^2)+a_n^4+2a_n^2b_n^2+b_n^4} \qquad (14)$$

$$\text{Delay}=\frac{2a_n(\omega^2+\beta_n)}{\omega^4+2\alpha_n\omega^2+\beta_n^2} \qquad (15)$$

When the singularity is on the real-axis, such as the zero 2, the delay component is simply $$\frac{a_n}{\omega^2+a_n^2} \qquad (16)$$

When the singularity is on the imaginary-axis, such as the poles 3, the delay component is zero except at the natural frequency of the singularity.

For convenience, the amplitude factors and delay components for the three types of singularities are grouped in the following table:

*Table I*

| | Amplitude factor | Delay component |
|---|---|---|
| Complex singularities $(p+a_n\pm jb_n)$ | $\sqrt{\omega^4+2\alpha_n\omega^2+\beta_n^2}$ | $\frac{2a_n(\omega^2+\beta n)}{\omega^4+2\alpha_n\omega^2+\beta_n^2}$ |
| Real-axis singularities $(p+a_n)$ | $\sqrt{\omega^2+a_n^2}$ | $\frac{a_n}{\omega^2+a_n^2}$ |
| Imaginary-axis singularities $(p\pm jb_n)$ | $\sqrt{(\omega^2-b_n^2)}$ | Zero, except at the frequency of the singularity. |

Assume now that a network has the following complex transmission $$e^{-\theta}=\frac{(p+a_1\pm jb_1)(p+a_3)(p\pm jb_5)}{(p+a_2\pm jb_2)(p+a_4)(p\pm jb_6)} \qquad (17)$$

this expression contains all three kinds of singularities so that the amplitude function is $$A=\sqrt{\frac{(\omega^4+2\alpha_1\omega^2+\beta_1^2)(\omega^2+a_3^2)(\omega^2-b_5^2)^2}{(\omega^4+2\alpha_2\omega^2+\beta_2^2)(\omega^2+a_4^2)(\omega^2-b_6^2)^2}} \qquad (18)$$

In Equation 18, the terms in the numerator represent infinite loss points while those in the denominator represent natural modes. For the same network the delay function is $$D=\frac{2a_1(\omega^2+\beta_1)}{\omega^4+2\alpha_1\omega^2+\beta_1^2}+\frac{a_3}{\omega^2+a_3^2}-\left[\frac{2a_2(\omega^2+\beta_2)}{\omega^4+2\alpha_2\omega^2+\beta_2^2}+\frac{a_4}{\omega^2+a_4^2}\right] \qquad (19)$$

Equation 19 shows that the delay function is the algebraic sum of the delay components, those representing infinite loss points being prefaced by a plus sign while those representing natural modes being prefaced by a minus sign.

Equations 18 and 19 show that the amplitude and delay functions both involve $\omega^4$ and $\omega^2$. In accordance with principles of the invention, time $(t)$ is substituted as a variable for $\omega$ so that the amplitude function appears as, $$A'=\sqrt{\frac{(t^4+2\alpha_1t^2+\beta_1^2)(t^2+a_3^2)(t^2-b_5^2)^2}{(t^4+2\alpha_2t^2+\beta_2^2)(t^2+a_4^2)(t^2-b_6^2)^2}} \qquad (20)$$

and the delay function as, $$D'=\frac{2a_1(t^2+\beta_1)}{t^4+2\alpha_1t^2+\beta_1^2}+\frac{a_3}{t^2+a_3^2}-\left[\frac{2a_2(t^2+\beta_2)}{t^4+2\alpha_2t^2+\beta_2^2}+\frac{a_4}{t^2+a_4^2}\right] \qquad (21)$$

Mechanization thus involves the generation of voltages proportional to time, and powers thereof, rather than $\omega$ which leads to greater flexibility as well as to simplified circuitry. For example, should the frequency band of interest involve several thousand megacycles, voltages proportional to $\omega^4$ would not only be difficult to generate but would involve complicated high frequency circuitry. By computing in the time domain, i.e., by substituting $(t)$ as the variable, a unit of time may arbitrarily be chosen in each case to keep circuitry simple. Further, since a unit of time such as one second may be made equal to any unit of frequency, for example, either 100 kilocycles or 100 megacycles, the computer requires no modification to compute over either a very narrow or a very broad band of frequencies. It may require more time but in network synthesis, the few additional seconds which may be required in the case of a very broad band calculation are an insignificant sacrifice. Apparatus embodying these and other principles of the invention will now be described.

Figure 2:
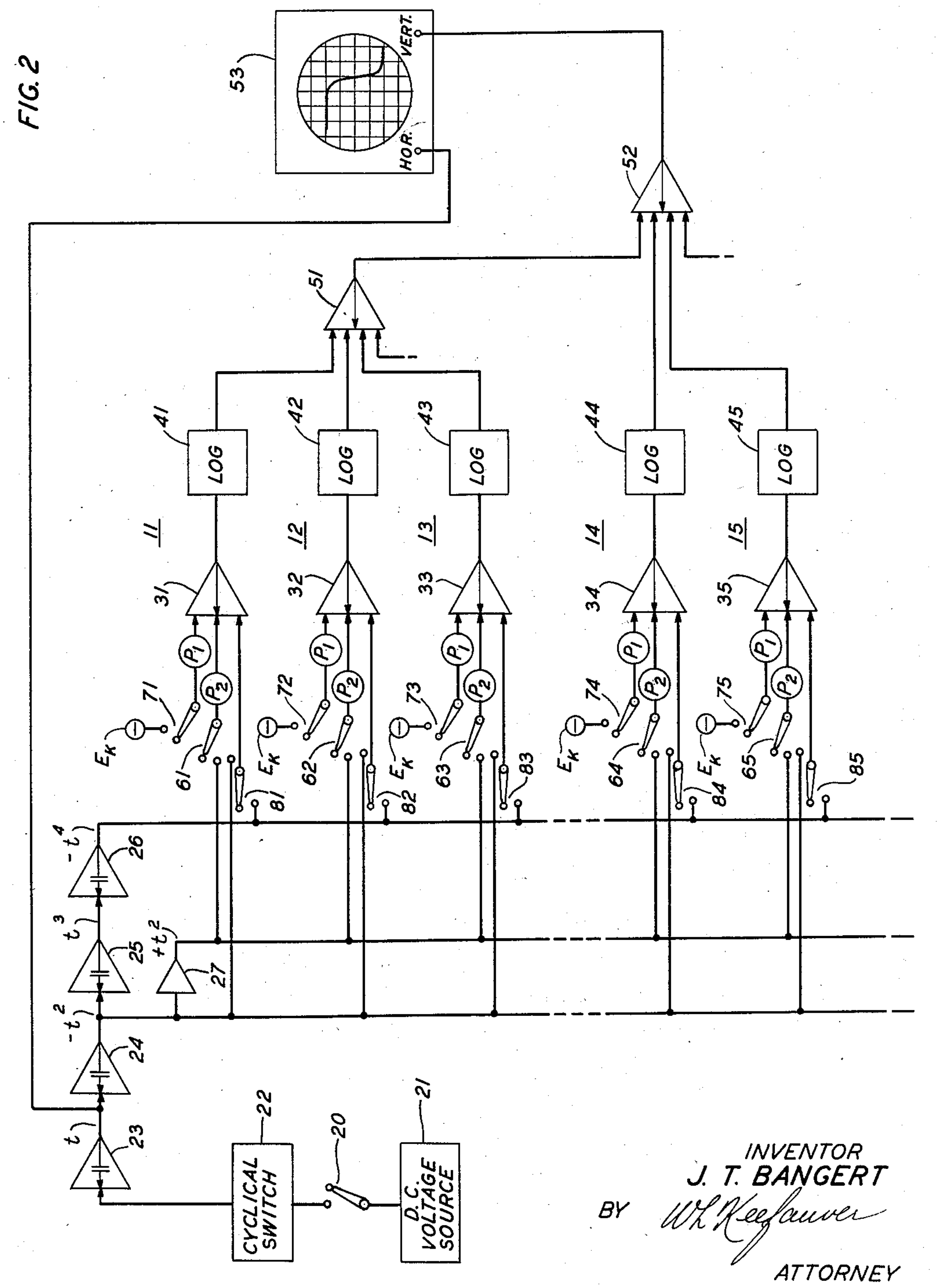
Fig. 2 represents by block schematic diagram, a computer embodying principles of the invention for calculating and displaying the amplitude characteristic of a network.
Figure 3:
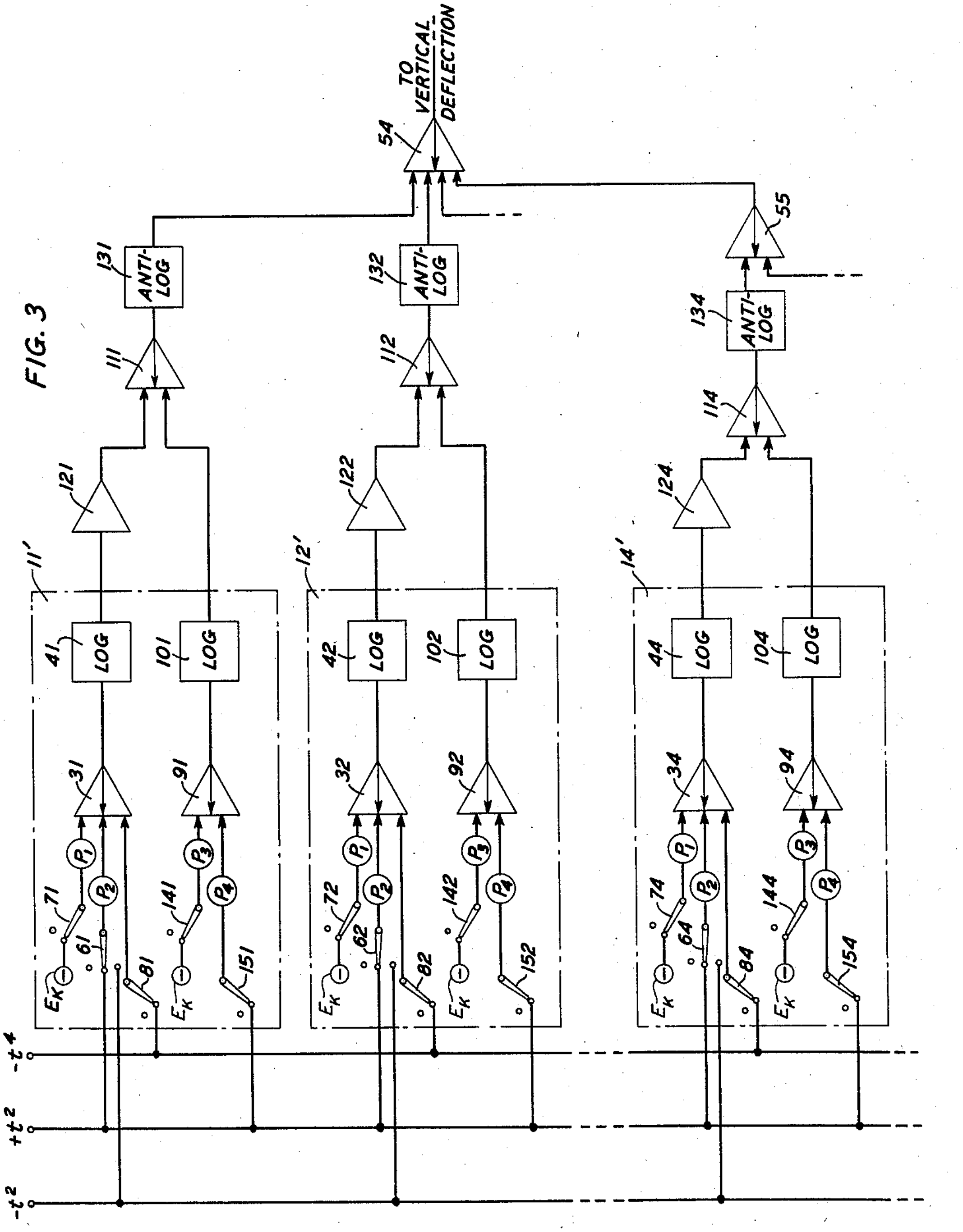
Fig. 3 shows by block schematic diagram a computer also embodying principles of the invention for calculating and displaying the delay characteristic of the network.

Although the apparatus illustrated in Figs. 2 and 3 may be combined in a single computer, it has been illustrated as two computers to better describe its operations in computing the amplitude and delay characteristic, respectively. The apparatus for rapidly calculating and instantaneously displaying the amplitude characteristics is illustrated in Fig. 2. This apparatus may be broken down into three major divisions. The first comprises the voltage source 21, cyclical switch 22 and integrators 23—26 in which voltages proportional to the first four powers of time are generated. A phase reversing amplifier 27 is also used to obtain $+t^2$. Actually, only voltages proportional to $t$, $+t^2$, and $-t^4$ are employed in the illustrative computer in addition to a constant voltage designated $E_k$. Since $\alpha_n$ may be negative, a voltage $(-t^2)$ is generated so that the term $2\alpha_nt^2$ may be made negative without the necessity of providing mechanization for negative values of $\alpha_n$. (It may be seen from Equations 20 and 21 that $\alpha_n$ appears only when multiplied by $t^2$.)

The second division comprises the computing components, namely, the summing amplifiers 31—35 and logarithmic networks 41—45, and the summing amplifiers 51 and 52 which combine the outputs of the logarithmic networks. The third division comprises the display apparatus which, in the illustrative embodiment, takes the form of an oscilloscope 53 having horizontal and vertical deflection controls.

A summing amplifier and logarithmic network such as 31 and 41 are necessary to calculate the contribution of each singularity, or pair of singularities as the case may be. Each summing amplifier is therefore provided with three inputs which, in the illustrative case, will be the maximum necessary, occurring in the case of a pair of complex singularities. A constant voltage $E_k$ is applied to the first input of each amplifier, a voltage plus or minus $t^2$ is applied to the second input of each amplifier and a voltage $-t^4$ is applied to the third input of each amplifier. Switches 61—65 are provided so that $+t^2$ or $-t^2$ may be applied to the second input of each amplifier. These switches, as well as the further switches 71—75 and 81—85 also provide means for disabling any of the amplifier inputs as required by the nature of the singularity. Potentiometers $P_1$ and $P_2$ are associated with the first and second inputs of each amplifier so that the coefficients of the voltages applied to these inputs may be adjusted in accordance with a specific singularity. If $P_1$ and $P_2$ are adjusted in accordance with $\beta_n^2$ and $2\alpha_n$, respectively, the output of each amplifier is a voltage $$E_n=(t^4\pm 2\alpha_n t^2+\beta_n^2) \qquad (22)$$

Each of the amplifiers is followed by a logarithmic network 41—45 so that the products of the amplitude factors may be obtained by summation rather than multiplication.

Since Equation 18 requires the difference of two logarithmic voltages, an extra phase reversal is inserted in the outputs of one group of computer components by means of the summing amplifier 51. The output of the amplifier 52 therefore represents the amplitude characteristic and is applied to the vertical deflection system of the oscilloscope. The reference voltage ($t$) is applied to the horizontal sweep. So that this display may be continuously observed, a cyclical switch 22 is provided to recycle the voltage source means on the order of once or twice a second. This switch must also discharge the capacitors in the integrators.

Figure 4A:
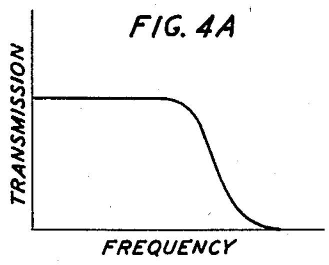
Fig. 4A is an illustrative transmission characteristic with Fig. 4B showing an array of singularities for a network which will have such a characteristic.
Figure 4B:
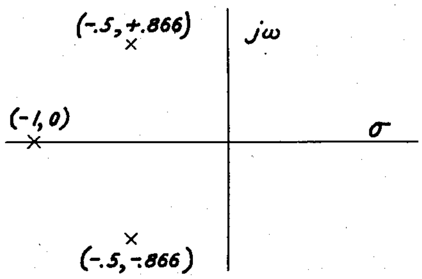

To illustrate the operations of this apparatus, assume that a low pass filter characteristic as illustrated in Fig. 4A is desired. The complex transmission for a simple low pass filter is $$e^{-\theta}=\frac{1}{(p+.5\pm j.866)(p+1)} \qquad (23)$$

so that $a_1=.5, b_1=.866$ and $a_2=1$ and the singularities lie on the complex frequency plane as illustrated in Fig. 4B. From equations (6), $\alpha_1=-.5$ and $\beta_1=1.0$ and the two amplitude factors reduce to $$\sqrt{t^4-t^2+1} \text{ and } \sqrt{t^2+1}$$

The amplitude characteristic of this network may be calculated and displayed by adjusting $P_1$ and $P_2$ of amplifier 34 each to one and switch 84 to apply $-t^4$ to the amplifier; and, by adjusting $P_1$ and $P_2$ of amplifier 35 also to one and by operating switch 85 to disable the $-t^4$ input of this amplifier. All remaining switches should also be moved to disabling positions. It will be noted that since all singularities in this case are infinite loss points, computing components from the second group were used.

The switch 20 may then be closed to apply voltage to the chain of integrators and the amplitude characteristic immediately observed. Should the observed characteristic differ in any respect from the desired characteristic, the potentiometers associated with the energized inputs may be adjusted until the desired characteristic is obtained. The latter process may be simplified by arranging the potentiometers on a control panel so that from left to right they represent singularities of increasing frequency with those representing infinite loss points situated immediately over those representing natural modes. By such an arrangement, it will be readily simple to adjust the potentiometers most likely to improve the characteristic to that desired and quickly obtain the desired characteristic. Once the desired characteristic is obtained, the setting of the potentiometers may be noted and for these settings the specification of the singularities in terms of $a$ and $b$ may be obtained.

Figure 5:
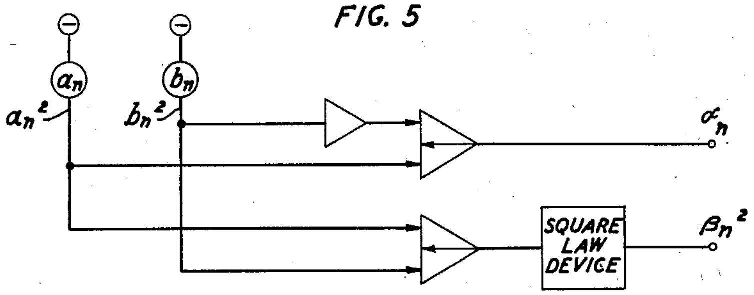
Fig. 5 shows, by clock schematic diagram a modification of the Fig. 2 circuit.

A table showing the relationship between $a$, $b$ and $\alpha$ and $\beta$ may be prepared in advance to simplify the latter computation. On the other hand, the potentiometer adjustments for some of the computer components may be mechanized so that they may be calibrated directly in terms of $a$ and $b$. Such a mechanism is illustrated in Fig. 5 wherein the potentiometers are calibrated in terms of $a_n$ and $b_n$, respectively, but produce output voltages proportional to $a_n^2$ and $b_n^2$, respectively. $\alpha_n$ is obtained by a pair of amplifiers whose ultimate output is $a_n^2-b_n^2$, or $\alpha_n$. A third amplifier sums $\alpha_n^2$ and $b_n^2$ to produce $\beta_n$. Since $\beta_n$ appears only in the amplitude function as $\beta_n^2$, a square law device is connected to the output of the amplifier to produce an output $\beta_n^2$.

Apparatus for calculating and displaying the delay characteristic is illustrated in Fig. 3. It may be noted that the components employed are similar in many respects to those employed in calculating the amplitude characteristic and similar numbers have been used to indicate such components. For example, each group of computing components 11', 12' . . . 14' . . . includes a summing amplifier 31, 32 . . . 34 . . . having potentiometers $P_1$ and $P_2$ controlling the $E_k$ and $\pm t^2$ inputs, respectively, followed by a logarithmic network 41, 42 . . . 44 . . . . In addition, however, each group also includes a second summing amplifier 91, 92 . . . 94 . . . with an $E_k$ input controlled by a potentiometer $P_3$ and a $\pm t^2$ input controlled by a potentiometer $P_4$. Each of the latter amplifiers is followed by a logarithmic network 101, 102 . . . 104 . . . . Switches 141, 142 . . . 144 . . . are provided to disable the $E_k$ inputs and switches 151, 152 . . . 154 . . . to disable the $+t^2$ inputs.

The computing components 31—41, 32—42 and 34—44 produce outputs of the form $t^4+2\alpha_n t^2+\beta_n^2$, assuming complex singularities while the components 91—101, 92—102 and 94—104 produce an output of the form $2a_n(t^2+\beta.)$. Since the quotient of these terms is required (Equation 21) or rather, the difference of their logarithms, they are combined in summing amplifiers 111, 112 . . . 114 with a phase reversing amplifier 121, 122 . . . 124 . . . being included in one input of each of the latter summing amplifiers to obtain a difference rather than a sum.

The delay function is the algebraic sum of the delay components so that the components are combined in a final summing amplifier 54 after being reconverted to linear terms by the anti-logarithmic characteristic networks 131, 132 . . . 134 . . . . The outputs from one set of computing components, indicated by only one, 14', in the drawing, are carried through a phase reversing summing amplifier 55 to account for those terms prefaced by a minus sign. Poles are therefore set up on the upper set of components such as 11', 12', etc. whose outputs are connected directly to the final summing amplifier 54 while those zeros will be set up on the lower components.

Each of the groups 11', 12' . . . 14' may therefore be considered a computing group so far as the delay characteristic is concerned. Also, as in the case of the amplitude function, these are also broken into two similar major groups, one including 11' and 12' for poles and one including 14' for zeros.

To illustrate operation, assume again the desired low pass filter characteristic and array of singularities as illustrated in Figs. 4A and 4B, respectively. The potentiometers associated with amplifier 34 are adjusted exactly the same as in the case of the amplitude function. In addition, potentiometer $P_3$ of amplifier 94 is adjusted to $2a_1\beta_1$ or 1 and potentiometer $P_4$ to merely $2a_1$ or, also 1. For the real-axis singularity, a second group of components similar to 14' and not illustrated are required. In this group, since the delay component is of the form $$\frac{a_2}{t^2+a_2^2}$$

the $t^4$ input would be disabled, $P_2$ adjusted to 1, and $P_1$ to $a_2^2$ or also 1. $P_3$ would be adjusted to $a_2$ or, 1, and the $P_4$ input would be disabled as would all remaining inputs of other amplifiers. Switch 20 (Fig. 2) would then be operated as before and the delay characteristic observed.

Figure 6:
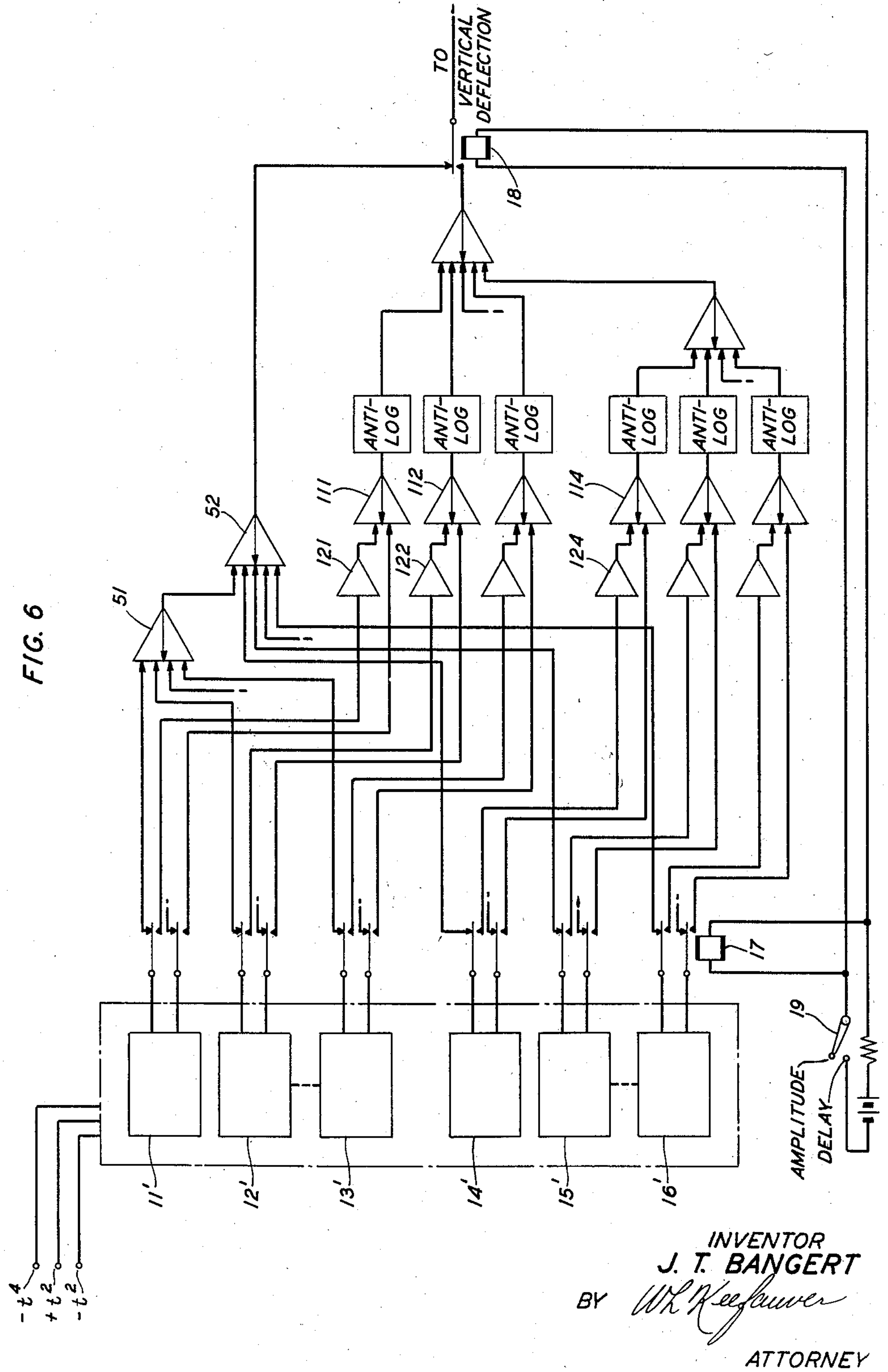
Fig. 6 illustrates the combination of the Figs. 2 and 3 apparatus into a single computer.

The manner in which the apparatus described may be combined in a single computer is illustrated in Fig. 6. Each of the computing groups 11'—16' is similar to the groups 11', 12' . . . 14' . . . illustrated in Fig. 3 and each is provided with two outputs. These outputs go to armatures of relays 17 and 18 shown in their released condition which is proper for calculating amplitude. As may be seen from the drawing, the circuit with the relays in the released condition is the same as in Fig. 2; i.e., one output of each computing group is connected to an input of either the summing amplifier 51 or 52. When operated, the circuit becomes as shown in Fig. 3. In this condition, both outputs from each computing group are employed, being necessary as discussed in relation to Fig. 3 to compute a quotient for each singularity.

Therefore, by operating the switch 19 from one position to the other, the apparatus will compute either amplitude or delay. Should there be any imaginary-axis singularities, it will, in addition, be necessary to disable those computing components adjusted in accordance with the location of such singularities when computing delay since they contribute nothing to the delay except at the frequency of such a singularity.

The apparatus described may be expanded in an obvious manner to include as many computing components as may be needed. Certain obvious modifications may also be made to account for less frequently occurring singularities such as those at either zero or infinity.

It should be noted also that although the discussion above has been in terms of the solution of amplitude and delay functions of a complex transmission, the principles of the invention are applicable to the solution of any two dimensional Laplace equation arising, for example, in either network theory or in two dimensional potential theory. In accordance with principles of the invention, such equations are solved by substituting real time for the variable of interest and combining voltages proportional to powers of time corresponding to powers of the variable in accordance with the boundary conditions of the equation to be solved.

Further, principles of the inventions are applicable also to digital computers although the illustrative computers discussed above use analog components.

Many other modifications and embodiments will readily occur to one skilled in the art so that the invention should not be deemed limited to the illustrative embodiments described above.

What is claimed is:

1. Apparatus for calculating and displaying the transmission characteristics of a network comprising a source of voltage varying linearly with time ($t$), means for generating voltages proportional to powers of time ($t$), a source of constant voltage, a plurality of computing components comprising summing amplifiers each having at least two inputs and each followed by a network having a logarithmic characteristic, means for selectively applying said generated voltages and said constant voltage to the inputs of each of said summing amplifiers, potentiometer means associated with at least two inputs of each of said amplifiers adjusted in accordance with the location on the complex frequency plane of the singularities of said network, means for combining the outputs of said logarithmic networks, oscilliscope display means having a vertical deflection system and a horizontal sweep control, means for applying said combined output to said vertical deflection system, and means for applying a voltage proportional to time ($t$) to said horizontal sweep control.

2. The combination in accordance with claim 1 wherein said combining means comprise a first and a second summing amplifier, means for applying the outputs of a first group of said computing components to the inputs of said first summing amplifier, means for applying the outputs of a second group of said computing components to the inputs of said second summing amplifier and means for also applying the output of said first amplifier to an input of said second amplifier.

3. The combination in accordance with claim 1 wherein said combining means comprise means for subtractively combining the outputs of pairs of said logarithmic networks, a network having an anti-logarithmic characteristic connected to the output of each of said subtractive combining means, and means for combining the outputs of said anti-logarithmic networks.

4. Apparatus for computing and displaying in the time domain the amplitude and delay characteristics of a network having singularities in the form of either natural modes or infinite loss points, or both, said apparatus comprising a source of voltage varying linearly with time ($t$), a chain of integrator means for deriving from said voltage further voltages proportional, respectively, to $t^2$ and $t^4$, a phase reversing amplifier supplied with said voltage proportional to $t^2$ for producing a voltage proportional to $-t^2$, computing components for each of said singularities, each of said computing components comprising a summing amplifier having a plurality of inputs, switching means for applying to the first one of said inputs of selected ones of said summing amplifiers a constant voltage, switching means for applying voltages $t^2$, $-t^2$ and $t^4$ to the other inputs, respectively, of selected ones of said summing amplifiers, potentiometer means associated with the corresponding input of each of said summing amplifier for adjusting the magnitude of the constant voltage and of the voltage $t^2$ applied thereto, networks having logarithmic characteristics connected to the outputs of each of said summing amplifiers; means for additively combining the outputs of selected ones of said logarithmic networks, said additive combining means comprising a first and second summing amplifier, means for applying the outputs of said logarithmic networks connected to summing amplifiers whose associated singularities are zeros to the input of said first summing amplifiers, means for applying the outputs of the logarithmic networks connected to summing amplifiers whose associated singularities are poles to the input of said second summing amplifiers, and means for also applying the output of said first summing amplifier to the input of said second summing amplifier; means for subtractively combining the outputs of selected ones of said logarithmic networks, said subtractive combining means comprising a third, fourth and fifth summing amplifier, each having two inputs and a phase reversing amplifier included in one of said inputs, means for applying the outputs of selected ones of said logarithmic networks respectively to the inputs of said subtractive combining means, a network having an anti-logarithmic-characteristic connected to the output of each of said subtractive combining means, a phase reversing amplifier connected to the output of at least one of said anti-logarithmic networks, and means for combining the outputs of all of said anti-logarithmic networks which comprises a sixth summing amplifier; a selector circuit including in series a multicontact relay, a source of potential and means for selectively energizing said relay, for connecting the outputs of predetermined ones of said logarithmic networks to said first and second summing amplifiers respectively and the output of said second summing amplifier to an output terminal for a first state of energization of said relay, and for connecting the outputs of predetermined ones of said logarithmic networks to said third, fourth and fifth summing amplifiers respectively and the output of said sixth summing amplifier to said output terminal for a second state of energization of said relay.

5. Apparatus for computing the transmission characteristic of a network having singularities in the nature of both poles and zeros, said apparatus comprising means for generating voltages proportional to powers of time, a plurality of computing components, one for each of the singularities of said network, each of said computing components comprising means for producing an output voltage proportional to a polynomial in powers of time, a first group of said plurality of computing components associated with singularities in the nature of poles and a second group of computing components associated with singularities in the nature of zeros, means for selectively applying said generated voltages to each of said computing components, means for producing a first voltage $E_1$ proportional to the products of the outputs of said first group of computing components, means for producing a second voltage $E_2$ proportional to the products of the outputs of said second group of computing components, and means for obtaining a voltage proportional to the quotient $$\frac{E_1}{E_2}$$

6. Apparatus for computing the amplitude characteristic of a network having singularities, poles and/or zeros, of the form $p+a_n\pm jb_n$ where $p$ represents the complex frequency plane which has a pair of coordinate axes omega ($\omega$) and sigma ($\sigma$), and $a_n$ and $b_n$ represent the distance of the $n^{th}$ singularity from the omega ($\omega$) and sigma ($\sigma$) axes, respectively, and where either or both $a_n$ and $b_n$ may be zero, said apparatus comprising a source of voltage varying linearly with time ($t$), a chain of integrator means for deriving from said voltage further voltages proportional, respectively, to $t^2$ and $t^4$, computing components for each of said singularities each comprising a summing amplifier having three inputs, means for applying a constant voltage $E_k$ to a first of said three inputs, means for applying said voltage $t^2$ with either polarity to the second input of each summing amplifier, and means for applying said voltage $t^4$ to the third input of each amplifier, potentiometer means associated with the first input of each amplifier and adjusted in accordance with the magnitude of $(a_n^2+b_n^2)$ of its associated singularity, potentiometer means associated with the second input of each amplifier and adjusted in accordance with the magnitude of $(a_n^2-b_n^2)$ of its associated singularity, means for disabling each of said three inputs, a plurality of networks having logarithmic characteristics connected to the output of each of said summing amplifiers, a first and second summing amplifier, means for applying the outputs of the logarithmic networks connected to summing amplifiers whose associated singularities are zeros to the input of said first summing amplifier, means for applying the outputs of the logarithmic networks connected to summing amplifiers whose associated singularities are poles to the input of said second summing amplifier and means for also applying the output of said first summing amplifier to the input of said second summing amplifier.

7. The combination in accordance with claim 6 and oscilloscope display means having a vertical deflection system and a horizontal sweep control, means for applying the output of said second summing amplifier to said vertical deflection system and means for applying said voltage proportional to $t$ to said horizontal sweep control.

8. Apparatus for computing the delay characteristic of a network having singularities of the form $p+a_n\pm jb_n$ where $p$ represents the complex frequency plane which has a pair of coordinate axes omega ($\omega$) and sigma ($\sigma$), and $a_n$ and $b_n$ represent the distance of the $n^{th}$ singularity from the omega ($\omega$) and sigma ($\sigma$) axes, respectively, and where either or both $a_n$ and $b_n$ may be zero comprising means for generating voltages proportional, respectively, to time ($t$), $\pm t^2$ and $t^4$, a plurality of computing components, one for each of said singularities, means for applying said generated voltages to the inputs of said computing components, means for disabling each of said inputs, each of said computing components comprising means for producing a first voltage proportional to $kt^4\pm 2\alpha_n t^2+\beta_n^2$, where $\alpha_n=a_n^2-b_n^2$ and $\beta_n=a_n^2+b_n^2$ and where $k$ is zero if either $a_n$ or $b_n$ is zero and otherwise is 1, and means for producing a second voltage proportional to $2a_n(t^2+\beta_n)$, means connected to the outputs of said computing components for obtaining voltages proportional to the quotients $$\frac{2a_n(t^2+\beta_n)}{kt^4\pm 2\alpha_n t^2+\beta_n^2}$$

and means for producing a voltage proportional to the sum of said quotients.

9. The combination in accordance with claim 7 wherein a first group of said plurality of computing components are associated with poles and wherein a second group of said plurality of computing components are associated with zeros and means for reversing the sign of the voltages produced by said second group of computing components with respect to the sign of the voltages produced by said first group of computing components.

10. Apparatus for computing the delay characteristic of a network having singularities in the form of either natural modes or infinite loss points, or both, said apparatus comprising a source of voltage varying linearly with time ($t$), a chain of integrator means for deriving from said voltage further voltages proportional, respectively, to $t^2$ and $t^4$, computing components for each of said singularities, each of said computing components comprising a first summing amplifier having three inputs, means for applying a constant voltage to a first of said three inputs, means for applying said voltage $t^2$ with either polarity to a second of said three inputs, means for applying said voltage $t^4$ to the third of said three inputs, potentiometer means for adjusting the magnitude of the voltage applied to the said first and second inputs, means for disabling each of said inputs, a second summing amplifier having two inputs, means for applying a constant voltage to the first of said two inputs and means for applying said voltage $t^2$ to the second of said two inputs and potentiometer means for controlling the magnitude of the voltages applied to said two inputs, networks having logarithmic characteristics connected to the outputs of said first and second summing amplifiers, means for subtractively combining the outputs of said logarithmic networks, networks having anti-logarithmic characteristics connected to the output of said subtractive combining means and means for combining the outputs of said anti-logarithmic networks.

References Cited in the file of this patent

"Problem Solving with Analog Computer," (Lakatos), Bell Laboratories Record, March 1951, pages 109–114.

"Some Electronic Analogue Computer Techniques," (Robb), The University of Connecticut Engineering Experiment Station, No. 9, January 1953, pages relied on 14–16.

"A Function Generator for the Solution of Engineering Design Problems," (Savant and Howard), I.R.E. Transactions-Electronic Computers, vol. EC-3, No. 3, September 1954, pages 34–38.